Patented Dec. 26, 1922.

1,439,887

UNITED STATES PATENT OFFICE.

WILLIAM G. HALL, OF CALIFORNIA, PENNSYLVANIA.

VEHICLE FOR PAINT PIGMENTS AND PROCESS OF MAKING SAME.

No Drawing.   Application filed January 27, 1922.   Serial No. 532,346.

*To all whom it may concern:*

Be it known that I, WILLIAM G. HALL, a citizen of California, county of Washington, and State of Pennsylvania, have invented a new and useful Vehicle for Paint Pigments and Process of Making Same, of which the following is a specification.

This invention has reference to vehicle for paint pigments and process of manufacturing the vehicle.

A specific object is to provide a paint vehicle which, when mixed with pigment will yield a paint which will not blister in the hot sun, a characteristic of many turpentine paints and need no additional dryer. Other objects will be made plain by the description.

In accordance with the invention pine wood which yields a tar and known as pinus palustris, pinus australis or pinus caribæa is chipped by any well known mechanical means and the chips are placed in an iron tank or boiler. For every cord of wood reduced to the form of chips placed in the tank or boiler, approximately one hundred pounds of ground flaxseed is added; also fifty gallons of water is run into the tank or boiler to every cord of wood and the whole is heated to a steam heat which will suffice to extract the oil from the wood as well as from the ground flaxseed. To the tank is attached a still-worm of any well known construction, which condenses the steam to water and a small amount of oil.

The oil drawn from the wood extracts the oil from flaxseed meal and effects a more complete extraction of the oil than most commercial processes.

The still-worm is surrounded by cold water which causes the steam from the water to be condensed. The vaporized oil also condenses, and when condensed the water and oil separates with the oil floating on top of the water. This condensate is easily drawn off the water.

About eighty or more gallons of oil is taken from a cord of wood and the proportional amount of flaxseed meal. The cooking or boiling process continues as long as any water comes from the still-worm and when no water is visible the cooking or boiling process is done and the oil remaining in the tank or boiler, being the residual oil, is let out into another vessel and the condensed oil is drawn off the water. These oils are then mixed.

The water not only helps to extract the oil from the wood, but keeps the oil afloat, making it easily distilled and purified, the steam carrying off the impurities. The wood and water after the cooking and boiling process is done has no further value in the paint vehicle and are discarded.

Stumps and doted wood may be used, stumps producing more and better oil.

The oil drawn from the wood may contain a trace of turpentine, but be it so, the oil extracted from the woods mentioned, contains substances, which when mixed with the oil from the flaxseed meal, form a new product, being a paint vehicle, with the oil from the wood predominating three to one or more over the oil taken from the flaxseed meal.

The residual oil is dark red in color, slightly thicker than linseed oil, and produces a high gloss paint when dry; while the distilled oil produces a gloss paint which is slightly flat. Either oil when used separately dries in about the same time, and when mixed as previously stated produces a gloss paint.

The oil after being mixed is about as thick as linseed oil and has no sediment when strained.

No change is made in applying one, two or three coats of paint, either on old or new painting, and when the paint is dry, the adhesion of the paint to the object painted is stronger than when linseed oil and turpentine is used.

The oil when mixed with paint pigments covers up well and does not have to be diluted with turpentine like linseed oil to cover up.

What is claimed:

1. An oil for use as a paint vehicle comprising the oil distillate and the residual oil resulting from heating with water a mixture of flaxseed meal and the wood of pinus palustris, pinus australis or pinus caribæa, in proportion of one hundred pounds of flaxseed meal one cord of wood and fifty gallons of water.

2. The process of producing a paint vehicle which consists in subjecting a mixture of flaxseed meal, the wood of pinus palustris, pinus australis or pinus caribæa and water, to a boiling temperature, condensing the lighter ingredients vaporized by the heat, separating the oil ingredients from the water and mixing the lighter oil and the residual oil.

3. The process of producing a paint vehicle which consists in subjecting a mixture of flaxseed meal, the wood of pinus palustris, pinus australis or pinus caribæa and water, to a boiling temperature, in proportion of one hundred pounds of flaxseed meal, one cord of wood and fifty gallons of water, condensing the lighter ingredients vaporized by the heat, separating the oil ingredients from the water and mixing the oil separated from the water with the residual oil.

WILLIAM G. HALL.